(12) United States Patent
Tsuboi et al.

(10) Patent No.: US 6,748,463 B1
(45) Date of Patent: Jun. 8, 2004

(54) INFORMATION PROCESSOR WITH SNOOP SUPPRESSING FUNCTION, MEMORY CONTROLLER, AND DIRECT MEMORY ACCESS PROCESSING METHOD

(75) Inventors: Masahide Tsuboi, Owariasahi (JP); Takashi Moriyama, Owariasahi (JP); Hiroshi Murashima, Owariasahi (JP); Masumi Terao, Owariasahi (JP); Michinori Naitoh, Seto (JP); Koichi Okazawa, Ebina (JP); Masaya Umemura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,599
(22) PCT Filed: Mar. 13, 1996
(86) PCT No.: PCT/JP96/00624
§ 371 (c)(1),
(2), (4) Date: Jun. 22, 2000
(87) PCT Pub. No.: WO97/34228
PCT Pub. Date: Sep. 18, 1997

(51) Int. Cl.$^7$ .............................................. G06F 13/14
(52) U.S. Cl. ...................... 710/22; 711/146; 711/137; 711/167
(58) Field of Search ........................... 710/22; 711/146, 711/137, 167

(56) References Cited

U.S. PATENT DOCUMENTS 5,341,487 A * 8/1994 Derwin et al. ............... 395/425
5,630,094 A * 5/1997 Hayek et al. ................ 395/473
6,115,796 A * 9/2000 Hayek et al. ................ 711/146

FOREIGN PATENT DOCUMENTS

| JP | 5474734 | 6/1979 |
| JP | 477847 | 3/1992 |
| JP | 7105086 | 4/1995 |

* cited by examiner

Primary Examiner—Abdelmoniem Elamin
(74) Attorney, Agent, or Firm—Antonelli, Terry, Stout & Kraus, LLP

(57) ABSTRACT

An information processing apparatus with a hierarchized bus structure having a system bus connected to central processing units and cache memories and an I/O bus connected to I/O devices. In response to a DMA request from the I/O device, a memory controller connected to both buses and to a main memory compares previous snoop addresses stored in a buffer memory of the memory controller with a current address contained in the DMA request to check whether the current DMA request is coincident with the past snoop process. If the comparison indicates a coincident snoop process, a snoop access process request is inhibited to be output to the system bus and cache memory. With this operation, the number of snoop accesses for DMAs to the same block of the cache memory can be reduced and a time during which the system bus is occupied can be shortened, to thereby improve the system performance.

9 Claims, 4 Drawing Sheets

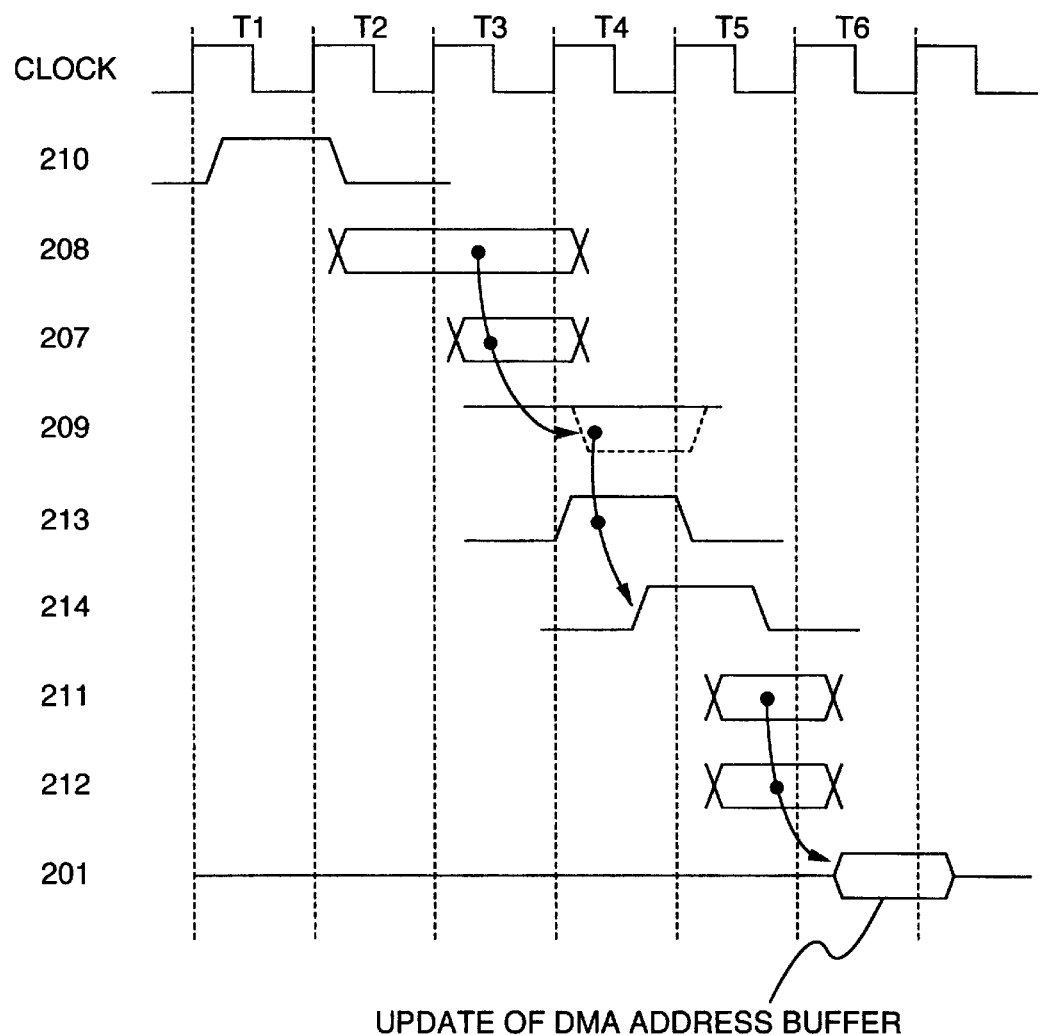

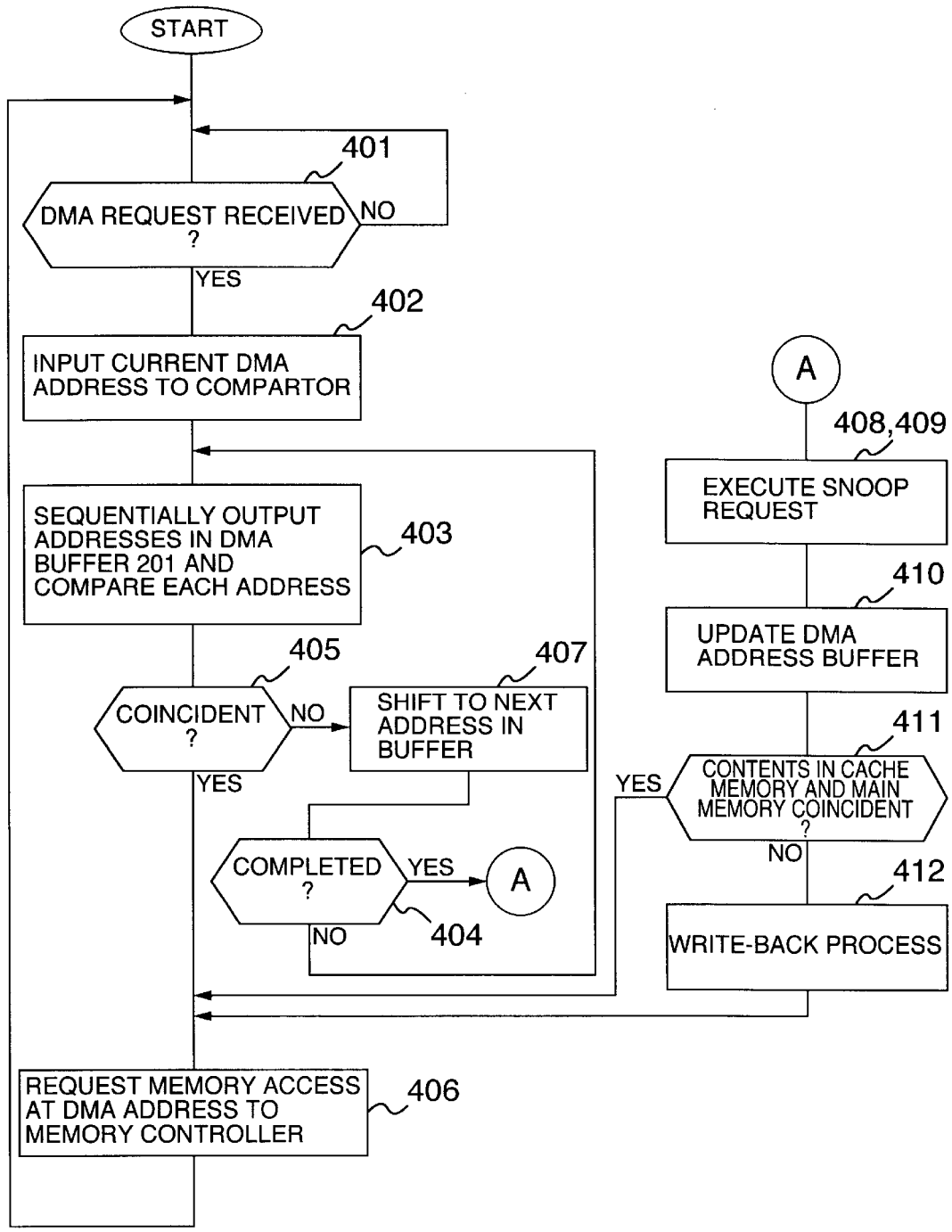

INFORMATION PROCESSOR WITH SNOOP SUPPRESSING FUNCTION, MEMORY CONTROLLER, AND DIRECT MEMORY ACCESS PROCESSING METHOD

TECHNICAL FIELD

The present invention relates to an information processing apparatus having a hierarchical memory structure and a direct memory access (DMA) function. More specifically, the invention is applied to an information processing apparatus in which integrity between hierarchized memories (e.g., between a main memory and a cache memory) is guaranteed by a snoop process when a DMA occurs.

BACKGROUND ART

In order to allow a CPU of an information processing apparatus to access memories at high speed, an information processing apparatus having a hierarchical memory structure of a cache memory and a main memory are becoming a main trend.

With a hierarchical memory structure, it is not necessary for CPU to access the main memory every time. From this reason, incorporation of a DMA control scheme is also becoming a main trend, by which scheme an I/O device or the like directly access the main memory while CPU is not accessing the main memory.

In realizing the DMA control scheme in an information processing apparatus having a hierarchical memory structure, it is necessary for a DMA process to execute data transfer between the main memory and the cache memory after integrity between data in the main memory and the cache memory is confirmed. Therefore, when a DMA occurs, a memory controller receiving DMA usually issues a snoop access request to the cache memory to confirm whether the cache memory has data or the like in the area indicated by a DMA address.

During this period, an access to the cache memory by a CPU is required to be temporarily suspended so that the system performance of the information processing apparatus lowers.

A conventional technique for solving this problem and improving the system performance is disclosed in JP-A-7-105086 "Bus Snoop Control Device".

With this conventional technique, when a snoop process for a cache memory occurs, a previous snoop address and a current snoop address are compared. If the current search is directed to the same block, an unnecessary interrupt of CPU is not executed so that the performance of CPU can be improved by an amount corresponding to one interrupt process.

This conventional technique is applied to the system structure that a plurality of CPU boards having a cache memory and a CPU are connected to one system bus to which a main memory and I/O channel boards are also connected. A snoop detector circuit for comparing a previous snoop address and a current snoop address is provided on the same CPU board as the cache memory.

Therefore, if an I/O channel board executes a DMA to the main memory, the system bus is occupied by the snoop access to the cache memory in the CPU board and by the DMA to the main memory.

Although an unnecessary interrupt process for CPU is suppressed by the snoop process for the cache memory, the system bus itself is occupied by the DMA so that the CPU board cannot use this system bus. During this period, communications between CPUs and the like cannot use the system bus. Namely, there is a problem that improvement on the system performance through reduction of system bus traffics cannot be expected.

DISCLOSURE OF INVENTION

The present invention aims at solving the above-described problem.

It is an object of the present invention to provide an information processing apparatus whose system performance is improved through interruption of an access to a cache memory by a CPU and reduction of system bus traffics, in response to a snoop access request, to provide a memory controller to be used by such information processing apparatus and to provide a direct memory access processing method.

In order to achieve the above object, the present invention provides an information processing apparatus having a first bus of upper upper level (system bus) for interconnecting a central processing unit (CPU) and a cache memory, a second but (I/O bus) for interconnecting an I/O device, a main memory, and a memory controller connected to the first and second buses and main memory for controlling the main memory, wherein an address indicated by a direct memory access request issued by the I/O device is compared with the contents of a buffer memory in the memory controller, and if there is any coincidence, a snoop access process request is inhibited to be sent to the cache memory or to the first bus.

The buffer memory in the memory controller stores addresses used for past direct memory accesses, i.e., addresses used when snoop process requests were issued in the past.

If a DMA access is issued to an area for which a snoop access was executed previously and if data in the cache memory is not updated, integrity between the cache memory and main memory can be guaranteed. The memory controller connected to both buses of a double-bus structure has an inhibition circuit for a snoop process. Therefore, it is possible to execute a direct memory access by using only the I/O bus without affecting the upper upper bus.

According to the present invention, an unnecessary snoop process for the main memory can be eliminated. Therefore, the number of unnecessary interrupt processes for CPU can be reduced and occurrence frequencies that the upper hierarchical bus of the double-bus structure is occupied by unnecessary signals, can be reduced.

Accordingly, communications between circuits connected to the system bus are not obstructed and the system performance can be improved.

In embodying the present invention, the number of buffer levels of the buffer memory for storing DMA addresses is not limited to one stage, but a plurality of buffer levels may also be used to further reduce the number of chances of suppressing the snoop process.

The control method for a hierarchical memory structure to be used by a system embodying the present invention is effective for all hierarchical memory structures such as a write-back cache scheme, a write-through cache scheme and a combination thereof. The number of hierarchical bus levels and the bus specifications are also not limited.

In addition to the information processing apparatus, the invention discloses a novel memory controller to be used by the apparatus.

Specifically, the memory controller has connection means for connection to the upper and lower level buses, connection means for connection to the main memory, and the above-described suppression circuit for the DMA process.

A snoop process request output from the connection means on the upper level bus side is suppressed to shorten the time during which the upper level bus is occupied.

BRIEF DESCRIPTION OF DRAWINGS

FIG. 3 is a timing chart illustrating the operation of each component shown in FIG. 2; and FIG. 4 is a flow chart showing a process of one embodiment of the invention.

BEST MODES FOR CARRYING OUT THE INVENTION

An embodiment of the invention will be described in detail with reference to the accompanying drawings.

Figure 1:
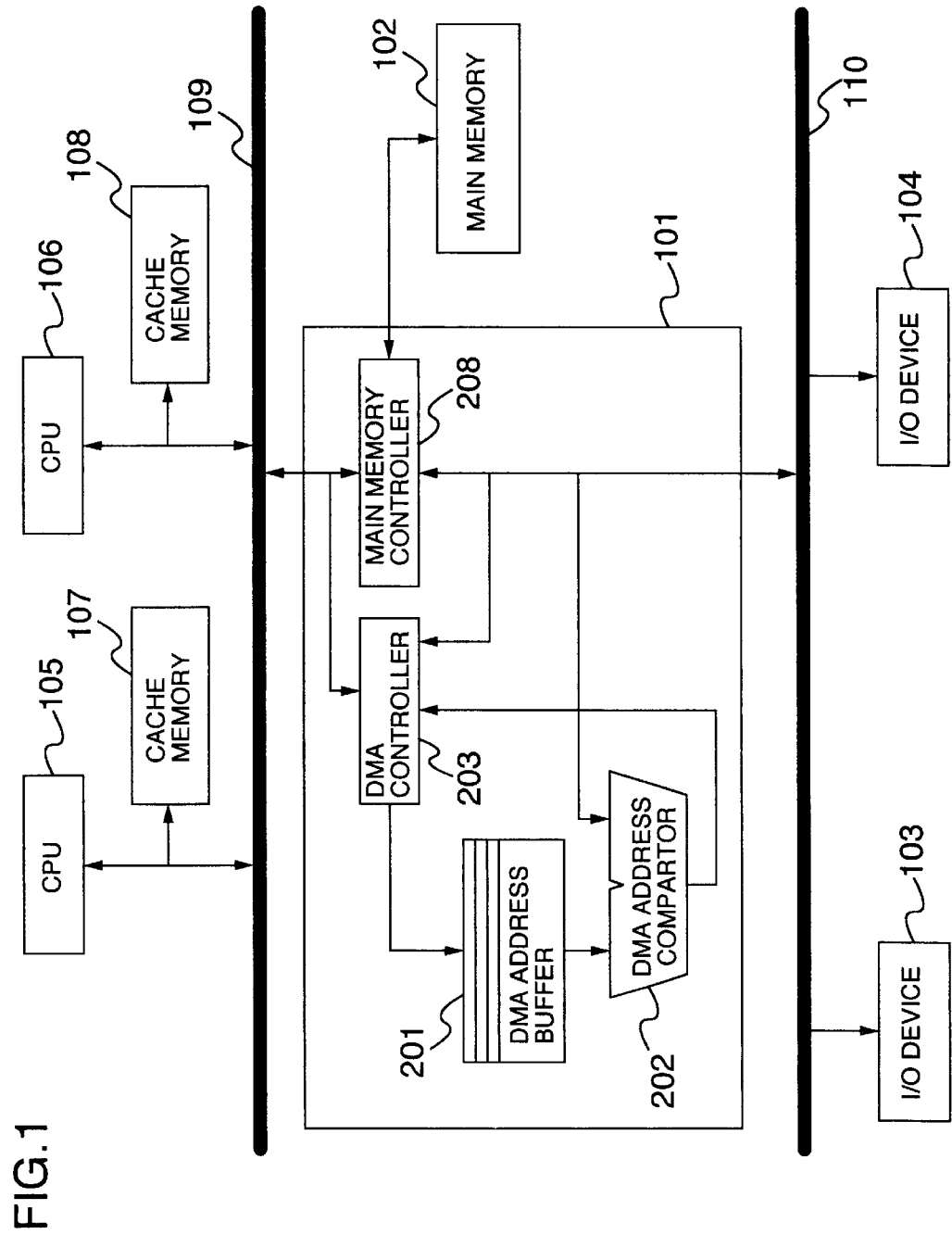
FIG. 1 shows the system configuration of an information processing apparatus according to an embodiment of the invention.

FIG. 1 is a diagram showing the embodiment of an information processing apparatus to which the invention is applied. In FIG. 1, reference numeral 101 represents a memory controller for controlling an execution of read/write (main memory access) such as data read from a main memory and data write to the main memory. Reference numeral 102 represents the main memory, reference numerals 103 and 104 represent I/O devices, reference numerals 105 and 106 represent CPUs, and reference numerals 107 and 108 represent cache memories. These components are connected to a system bus 109 and an I/O bus 110.

In this information processing apparatus, data transfer for a direct memory access (DMA) requested from the I/O device is executed by the I/O device 110, memory controller 101 and main memory 102. A snoop access process for the cache memories 107 and 108 is executed by the memory controller 101, system bus 109 and cache memories 107 and 108.

The memory controller operates to reduce the number of snoop accesses for DMAs and the traffics of the system bus 109 as well as not to interrupt accesses to the cache memories 107 and 108 by CPUs 105 and 106. In this way, the system performance of the information processing apparatus can be improved.

Figure 2:
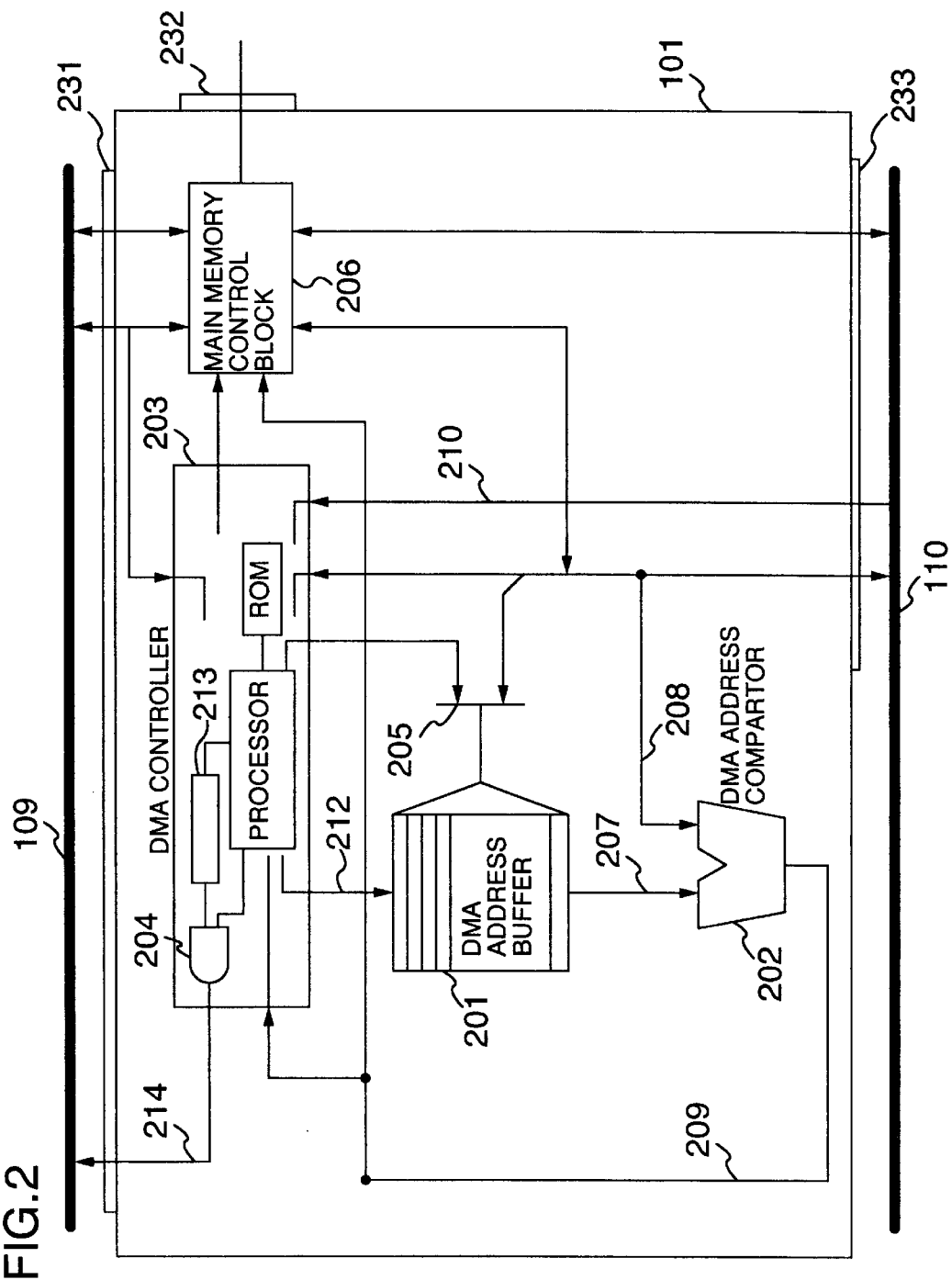
FIG. 2 is a block diagram showing the detailed structure of a memory controller 101 shown in FIG. 1.

FIG. 2 is a diagram showing the details of the memory controller of the information processing apparatus shown in FIG. 1. In FIG. 2, reference numeral 201 represents a DMA address buffer for holding DMA addresses used by past snoop accesses. Reference numeral 202 represents a DMA address comparator for comparing the contents in the DMA access buffer 201 with a current DMA address. Reference numeral 203 represents a DMA controller for controlling a read/write operation relative to the DMA address buffer 201 and an operation of outputting a cache snoop request signal to the system bus 109. Reference numeral 204 represents a suppressor for controlling an output of the cache snoop request signal from the DMA controller 203 to the system bus 109, in accordance with an operation result of the DMA address comparator 202. Reference numeral 205 represents a selector for selecting a read/write address of the DMA address buffer 201. Reference numeral 206 represents a memory control circuit for controlling the main memory 102. Reference numeral 207 represents a signal line for transferring data read from the DMA address buffer 201.

Reference numeral 208 represents a signal line for transferring a DMA address supplied via the I/O bus 110. Reference numeral 209 represents a signal line for transferring a snoop access suppression signal. Reference numeral 210 represent a signal line for transferring a DMA request signal. Reference numeral 211 represents a signal line for transferring an access address of the DMA address buffer 201 when data is written. Reference numeral 212 represents a signal line for transferring data to be written in the DMA address buffer.

The memory controller 101 is made of a memory controller chip which is connected to the system bus 109 via a connection interface 231, to the main memory 102 via a connection interface 232, and to the I/O bus 110 via a connection interface 233.

When the I/O device 103 or 104 executes a DMA to the main memory 102, it outputs a DMA request signal 210 to the I/O bus 110.

Upon detection of the DMA request signal, the DMA controller 203 executes a read access to the DMA address buffer 201 at a DMA address supplied via the I/O bus. In this case, the DMA controller 203 controls the selector 205 to select the DMA address from the I/O bus.

Read data 207 output from the DMA address buffer 201 is input to the DMA address comparator 202 and compared with the DMA address 208 from the I/O bus.

If this comparison operation indicates that the DMA address 208 does not coincide with the data 207 read from the DMA address buffer 201, i.e., if it is judged that the snoop access was not executed in the past, the comparator 202 does not output a suppression signal to the suppressor 204.

Then, the DMA controller 203 controls the selector 205 to select the write access address 211 in order to write the current DMA access address in the DMA address buffer 201.

The DMA controller 203 outputs the write data 212 to write it in the DMA address buffer 201 and update the contents of the DMA address buffer 201.

If the DMA address buffer 201 is full of data, the current DMA access address is overwritten upon the oldest stored address.

If the comparison result by the DMA address comparator 202 indicates an address coincidence (if a predetermined number of bits (upper bits) of the address is coincident), it is judged that a DMA access to the same block as the previous DMA access address has occurred, i.e., the contents of the cache memory 107 or 108 were not updated.

Since it is confirmed that the DMA access to the same block occurred in the past, the comparator 202 outputs the snoop suppression signal 209. Upon reception of this snoop suppression signal 209, the suppressor 204 inhibits the snoop access signal to be output from the DMA controller 203 to the system bus 109. With this operation, the DMA operation can be executed by using only the I/O bus 110 without occupying the system bus 109.

FIG. 3 is a timing chart illustrating the above-described operation. At T1, a DMA request signal 210 is issued. Next, at T2 a DMA address 208 is issued via the I/O bus and at the same time the DMA controller 203 executes a read access to the DMA address buffer 201. The DMA address buffer 201 outputs the access result at T3. The DMA address comparator 202 compares the output data from the DMA address buffer 201 with the DMA address 208 from the I/O bus, and outputs a snoop suppression signal 209 at T4. The DMA controller 203 outputs a snoop signal (1) 213 at T4. Basing upon the snoop signal (1) and the snoop suppression signal, the suppressor 204 outputs a snoop signal (2) 214 to the system bus.

In the above operation, if the DMA address buffers 201 does not have the current DMA address, the DMA controller 203 executes a write access to the DMA address buffer 201 by monitoring the status of the snoop suppression signal 209 at T4. If the snoop suppression signal 209 is not issued at T4, the DMA controller 203 issues the write access address 211 and write data 212 to update the contents of the DMA address buffer 201.

Next, the operation of the DMA controller 203 will be further detailed with reference to FIG. 2 and a flow chart shown in FIG. 4.

In the DMA controller 203, a processor reads and executes microprograms stored in a ROM, to thereby perform the following control.

The DMA controller 203 executes initial setting of the suppressor 204 in a suppression state that the suppressor 204 does not output the snoop request signal to the system bus 109.

Upon reception (401) of a DMA request, the DMA controller 203 sets a DMA address contained in the DMA request to the DMA address comparator 202 (402). Next, the DMA controller 203 controls the selector 205 to sequentially output addresses stored in the DMA address buffer 201, and makes the DMA address comparator 202 to sequentially compare each output address (403).

If there is any coincident address (405), the DMA controller 203 instructs the memory control circuit 206 to access the main memory at the address indicated by the DMA address in the DMA request, and thereafter terminates the process (406).

If there is no coincident address at Step 405, a comparison with the next address in the DMA address buffer is executed (407, 403).

If the comparison with all addresses in the buffer is completed with no coincident address (404), the suppression state of the suppressor 204 is released (408) and a snoop request is issued to the cache memory (409).

After the snoop request is output, the current DMA address is written in the DMA address buffer 201 to update the contents thereof (410).

If the snoop process confirms that the contents in the cache memory 107 or 108 and main memory are coincident (411), the process same as that of Step 406 is executed.

If it is confirmed at Step 411 that the contents of the cache memory and main memory are not coincident, a write-back process from the cache memory to the main memory is executed to make the contents of them coincide (412) and thereafter execute the process same as that of Step 406. With the above operations, the snoop access request for the DMA process relative to the same block in the cache memory is suppressed to thereby improve the system performance. The snoop control method of this invention is realized in the above manner.

The snoop control method of this invention is applied to a system having a hierarchical memory structure and adopting a snoop scheme as the means for guaranteeing integrity between the main memory and cache memory when a DMA occurs. With the snoop control method of this invention, the number of snoop accesses for DMAs relative to the same block of the cache memory can be reduced and the time during which the system bus is occupied can be shortened, to thus improve the system performance.

INDUSTRIAL APPLICABILITY

This invention is applied to an information processing apparatus having a hierarchical memory structure and a direct memory access (DMA) function, particularly to an information processing apparatus which performs a snoop process in order to guarantee integrity between hierarchized memories (e.g., a main memory and a cache memory) when a DMA process is executed. With this invention, it is possible to improve the system performance by shortening a memory access time while integrity between hierarchized memories is guaranteed when a DMA process is executed.

What is claimed is:

1. An information processing apparatus, comprising:
   a processor,
   a cache memory,
   a main memory,
   a memory controller for controlling the main memory,
   a first bus for interconnecting the cache memory and the memory controller:
   an I/O device which outputs a direct memory access request to the memory controller, and
   a second bus for interconnecting the memory controller and the I/O device;
   wherein the memory controller comprises a buffer memory for storing a plurality of addresses of past snoop accesses; and
   a direct memory access controller suppresses output of a snoop access request to the cache memory and executes an access to the main memory corresponding to the direct memory access request by the I/O device to transfer data to the I/O device when a direct memory access request is coincident with any one of the addresses stored in said buffer memory.

2. An information processing apparatus with a snoop process suppressing function according to claim 1, wherein the first bus is connected to a plurality of central processing units.

3. An information processing apparatus with a snoop process suppressing function according to claim 1, wherein the memory controller includes:
   a comparator for comparing the address stored in said buffer memory with at least a portion of an address of a current direct memory access corresponding to at least the portion of the address stored in said buffer memory; and
   a suppression circuit for suppressing the snoop access if a comparison result by the comparator indicates a coincidence.

4. An information processing apparatus comprising:
   a central processing unit,
   a cache memory,
   a main memory,
   a memory controller,
   a first bus connecting the cache memory and the memory controller
   an I/O device, and
   a second bus for interconnecting the memory controller and the I/O device;
   wherein the memory controller comprises a buffer memory for storing a plurality of addresses of past snoop accesses; and
   a direct memory access controller outputs a snoop access request to the first bus when a direct memory access requested by the I/O device is inconsistent with any one of the addresses stored in said buffer memory, and executes an access to the main memory corresponding to the direct memory access request by the I/O device.

5. An information processing apparatus with a snoop process suppressing function according to claim 4, wherein the first bus is connected to a plurality of central processing units.

6. An information processing apparatus according to claim 4, wherein the direct memory access controller suppresses output of a snoop access request to the cache memory when a direct memory access request is coincident with any one of the addresses stored in said buffer memory.

7. A direct memory access processing method for an information processing apparatus having a first bus for interconnecting a central processing unit and a cache memory, a second bus for interconnecting an I/O device, a main memory, and a memory controller connected to the first and second buses and the main memory for controlling the main memory, the method comprising the steps of:

making the memory controller store a plurality of predetermined ranges of addresses of direct past memory access requests received from the I/O device, in a buffer memory in the memory controller;

upon reception of a direct memory access request from the I/O device, making the memory controller compares each of the addresses stored in the buffer memory with a predetermined range of an address used for the direct memory access;

suppressing a snoop access process request from being sent to the cache memory if a comparison result indicates a coincidence; and accessing the main memory at an address requested by the direct memory access request and sending an access result to the I/O device.

8. A direct memory access processing method according to claim 7, wherein if said buffer memory has no empty space, an oldest stored address is deleted to acquire a storage area.

9. A memory controller having first and second connection means for data transfer to an external and third connection means for connection to a storage unit, wherein a snoop process request signal is output to the first connection means when an access request to the storage unit is received from the second connection means, and after a response to the snoop process request signal is input to the first connection means, an access result to the storage unit corresponding to the access request is output to the second connection means, the memory controller comprising:

a buffer memory for storing a plurality of predetermined ranges of addresses associated with past access requests input from the second connection means;

means for judging whether the snoop process request signal is output or not, by comparing a predetermined range of an address associated with an access request input from the second connection means with the predetermined ranges of the addresses stored in said buffer memory; and means for suppressing the snoop process request signal from being output to the first connection means, in accordance with a judgment result by said judging means.

* * * * *